3,491,655
BLOWN PLASTIC EXTRUSION DEVELOPMENT
Donald A. Brafford, Beloit, Wis., assignor to Beloit Corporation, Beloit, Wis., a corporation of Wisconsin
Continuation-in-part of application Ser. No. 536,705, Mar. 23, 1966. This application Feb. 23, 1968, Ser. No. 729,841
Int. Cl. B31b 1/26
U.S. Cl. 93—1   8 Claims

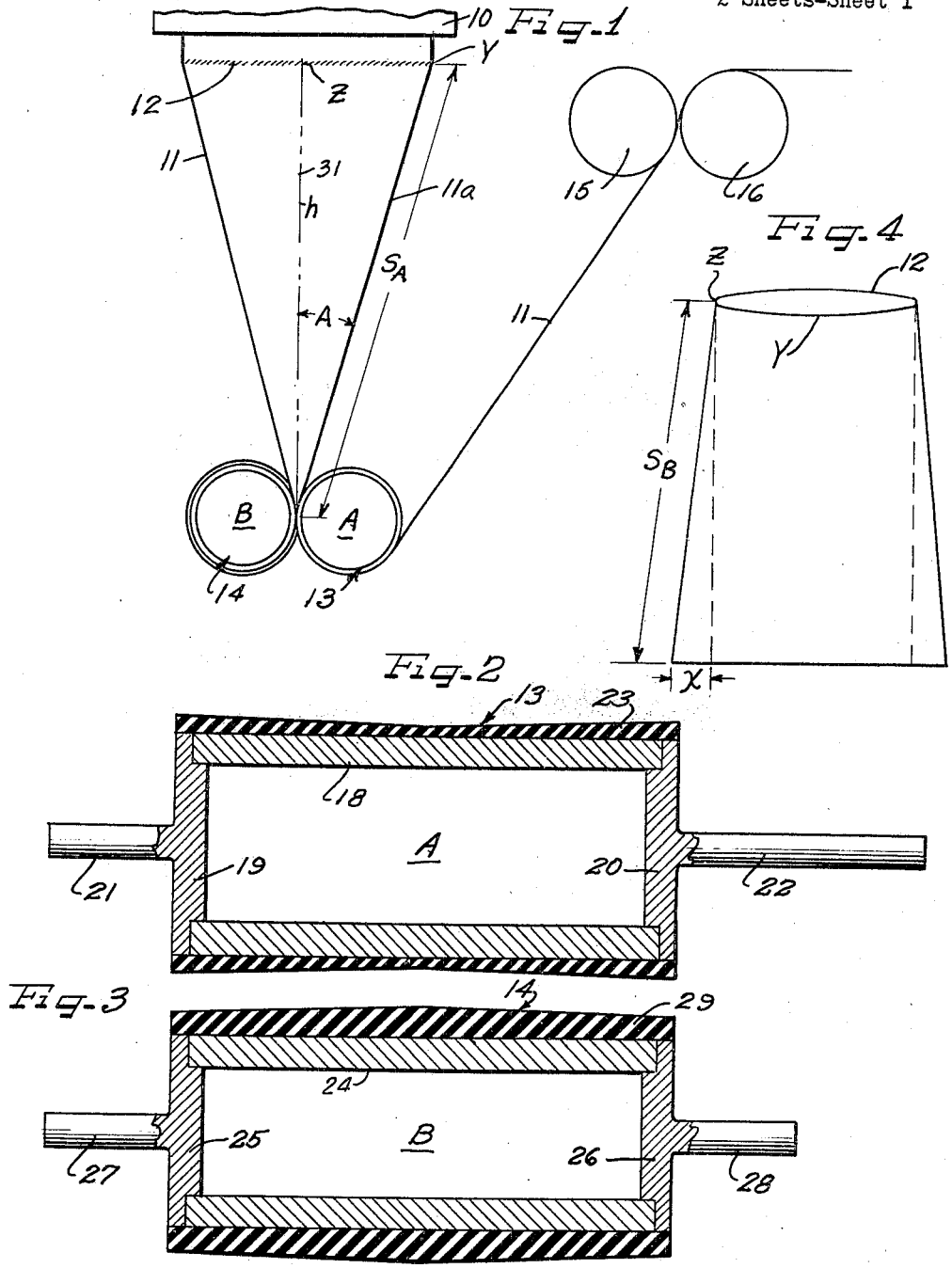

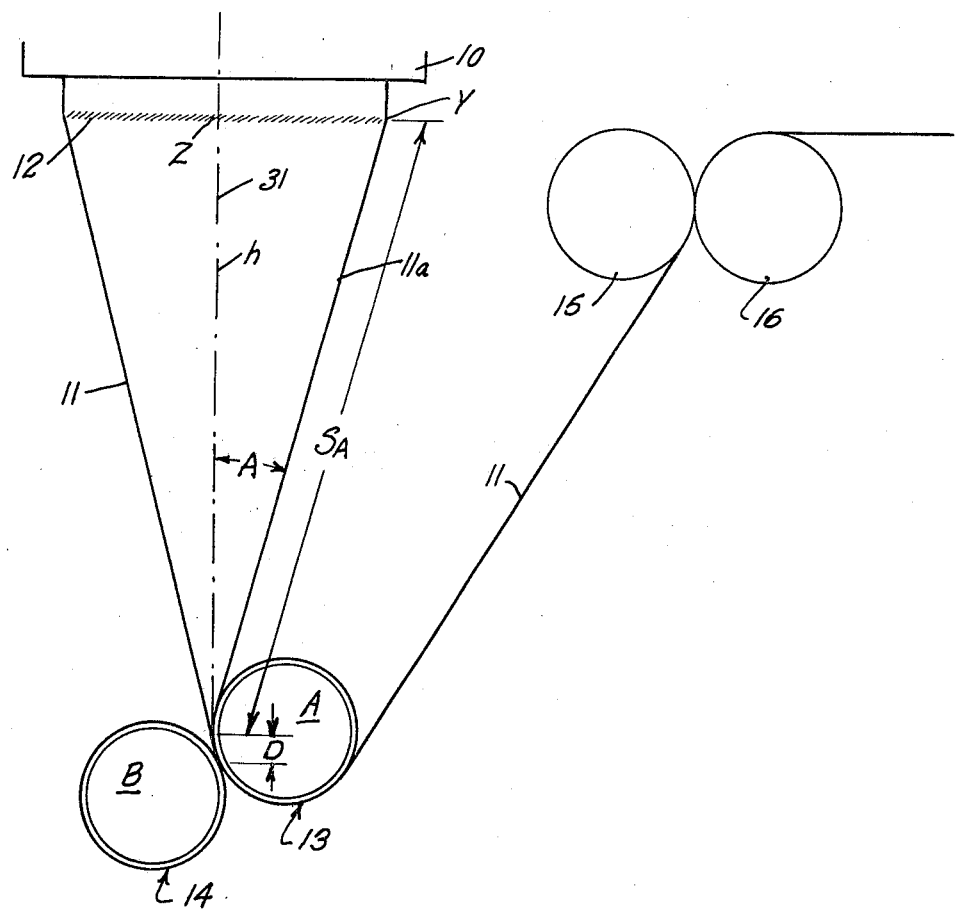

ABSTRACT OF THE DISCLOSURE

This invention is directed to an apparatus which includes a pair of forming rolls for flattening tubular film produced by an extruding head. The pair of rolls have sleeves of resilient material secured to the roll and fashioned in such a manner as to cause the film passing through the roll to move at different speeds along the axial extent of the roll. Additionally one form of the invention provides positioning one roll adjacent the other so that the nip region formed between the rolls is displaced from the region of initial contact of the film with one of the rolls.

---

This is a continuation-in-part of my application Ser. No. 536,705, filed Mar. 23, 1966.

Background of the invention

This invention relates to a pair of rollers which are used to flatten an extruded tubular film of thermoplastic resin.

During the manufacture of extruded plastic film, the molten thermoplastic resin passes through an extruding head of the desired geometry. For purposes of illustration, the extruding head which is used in conjunction with the apparatus of the present invention may be of the type having circular inner and outer dies which are substantially concentric to one another. The annular dimension between the inner and outer dies is such as to produce a continuously extruded film of cylindrical shape, which will be referred to hereinafter as a tube. As the thermoplastic resin leaves the extruding head, its temperature is still relatively high and the tubular film remains substantially in a non-elastic yieldable state.

The size of the tubular film may be controlled by supplying fluid pressure to the interior of the tube in the region where the thermoplastic resin is still non-elastic and yieldable. By varying the pressure differential between the interior and exterior of the film at the region where the film is non-elastic and yieldable, variations in tube diameter are effected. For example, an interior pressure which is slightly greater than the exterior pressure will cause the tube to stretch to a diameter which is greater than its original extruded diameter. On the other hand, an interior pressure which is slightly less than the exterior pressure will cause the tube to contract to a diameter which is less than its original extruded diameter.

As the extruded tubular film is conveyed from the extruding head, e.g., downwardly by gravitational force, it remains substantially non-elastic and yieldable. However, at a point some distance from the extruding head the tubular film is cooled and the thermoplastic resin solidifies, so to speak. This point is known as the freeze-line. For purposes of explanation of the operation of the present invention, the freeze-line is considered to be uniform and may appear as an annulus on the tubular film which remains in a fixed position relative to the moving tube; however, it need not be construed solely thereto.

The cooling of the tubular film may be accomplished by any suitable means and forms no part of the present invention. However, the present invention has particular utility when used in conjunction with the cooling means which are facilitated by water quenching or the like, rather than cooling by ambient air.

When using the water quenched cooling method in the manufacture of tubular plastic film, the overall dimension of the manufacturing apparatus is greatly reduced since the travel distance between the extruding head and the forming rollers can be substantially reduced. However, when the travel distance is reduced it is found that the center portion of the flattened film becomes substantially longer than the folded edge portions, thereby causing bagging in the center of the film.

Summary of the invention

Therefore, one of the primary objects of the present invention, particularly from a manufacturing standpoint, is to provide a pair of forming rollers to flatten extruded tubular film which do not cause bagging in the center of the flattened film.

Another object of the present invention is to provide a pair of forming rollers which are relatively inexpensive to manufacture and which provide a high degree of reliability and efficiency.

Another object of the present invention is to provide a pair of forming rollers, the configuration of which can be changed quickly and easily.

Still another object of the present invention is to provide a pair of forming rollers for use in forming extruded tubular thermoplastic film, which rollers need not be constructed of corrosion-resistant metal.

A feature of the present invention is the use of a pair of forming rollers each having resilient surfaces, and the degree of resiliency of each roller being different from one another.

Another feature of the present invention is the use of one concave roller which has a relatively low degree of yieldability, and the use of one convex roller which has a relatively high degree of yieldability.

Another object of the present invention is to provide a pair of rolls for flattening tubular film and where one of the roll is wrapped by the film and the other roll forms a nip region therewith a distance displaced from the initial contact of the film with the roll wrapped by the film.

Briefly, the molten thermoplastic resin passes from an extruding head in the form of a tubular film. The tubular film is sized by suitable means in route therefrom, and subsequently cooled to fix the size of the tubular film to a predetermined dimension. The film then passes between a pair of forming rollers which flatten the film to form a continuously moving web. The forming rollers are so fashioned as to compensate for variations in film speed at different lateral points of the film to eliminate deforming of the film as it is flattened between the rollers. Additionally, the film is wrapped about a portion of one of the rolls and the other roll is positioned adjacent the first roll to form a nip region between the rolls and which nip region is displaced from the line of initial contact of the film with the first roll.

These and other objects and features will be more fully realized and understood from the following detailed description when taken in conjunction with the accompanying drawings in which like reference numerals throughout the various views of the drawings are intended to designate similar elements or components.

Brief description of the drawings

FIGURE 1 illustrates schematically an extruded tubular film passing from an extruder to a pair of forming rollers;

FIGURE 2 is an elevational sectional view of a concave roller which is constructed in accordane with the principles of this invention.

FIGURE 3 is an elevational sectional view of a convex roller which is constructed in accordance with the principles of this invention;

FIGURE 4 is a diagrammatic representation of the flattened film shown in FIGURE 1; and FIGURE 5 illustrates schematically an alternate arrangement of the rolls of FIGURE 1 for flattening the tubular film of an extruding device.

Description of the preferred embodiments

As seen in FIGURE 1, molten thermoplastic resin passes from an extruder 10 to form a tubular film 11. The cooling of the film is accomplished by suitable means, and the cooling point is indicated by the freeze-line 12. The film 11 passes between a pair of forming rollers 13 and 14 and is wrapped partially about the roller 13. The film 11 then passes between a pair of rollers 15 and 16 for further flattening, if necessary. After the film passes between the rollers 15 and 16, it may be processed as desired.

As seen in FIGURE 2, the roller 13 is constructed of a cylindrical core 18 which has a pair of end caps 19 and 20 secured thereto. The cylindrical core 18 and end caps 19 and 20 are preferably of metal construction and are fastened together by welding or other suitable means. The end cap 19 has a shaft 21, and the end cap 20 has a shaft 22 which, in turn, is connected to suitable drive means (not shown). An outer sleeve 23 of relatively hard resilient material is positioned over the core 18 and end caps 19 and 20 to form the pressing surface of the roll 13. The sleeve 23 is uniformly concave throughout the circumference thereof, as seen in FIGURE 2. By way of example, the relative hardness of the sleeve 23 is preferably 0–2 as measured by the P & J hardness test.

Seen in FIGURE 3 is a detail sectional view of the roller 14. The roller 14 is constructed of a cylindrical core 24 which is closed at the ends by a pair of end caps 25 and 26. The end cap 25 has a shaft 27, while the end cap 26 has a shaft 28 and the shafts 27 and 28 are journaled by suitable means. Preferably, the roller 14 is not driven, but rather is rotated by the roller 13.

A sleeve 29 is positioned over the core 24 and end caps 25 and 26 to form a substantially yieldable pressure surface. By way of example, the relative hardness of the sleeve 29 is approximately 25 as measured by the P & J hardness test.

The rollers 15 and 16 preferably are of the same construction as the roller 14, with the exception that the rollers 15 and 16 have straight surfaces rather than convex surfaces.

As mentioned hereinabove, the forming rollers 13 and 14 of the present invention have particular utility when used in conjunction with a cooling technique which reduces the travel distance of the film between the extruding head and the forming rollers. Therefore, for a better understanding of the novel features of the present invention, a brief discussion of the geometric aspects which are encountered when flattening tubular film is set forth hereinbelow.

There are several basic differences of the water quench technique as compared to the more conventional air-cooled process. One difference is that the apparatus used for the water quench technique is substantially more compact than the apparatus required for the air-cooled technique. In so reducing the overall dimension of the film manufacturing apparatus, certain geometric problems arise. For example, the rate of change of the tubular film from its tubular form to the flattened form is greatly increased. That is, the angle A which exists between the axis 31, which passes through the center of the film 11, and the surface 11a of the film 11, becomes greater as the height $h$ between the freeze-line 12 and the nip region of the rollers 13 and 14 decreases. As the height $h$ decreases the velocity of the center of the film becomes greater than the velocity of the film at its folded edges.

In order to correct the cause of this problem, or attempt compensation for its effects, one must understand the reason for the differences in speed throughout various points of the flattened film. The first step is to examine the several points where the film originates or, in other words, when the material is transformed from a yielding molten state into a fixed hardened state at the freeze-line 12. Once the film is established or fixed, it is difficult to compensate for the effect since it now exhibits elastic properties. These elastic properties have very low permanent set at modest elongation.

Analyzing the geometry at any given instant of time, it is found that the length of the film at the center is a total of the distance from the originating point to the freeze-line 12 plus the angular distance from the freeze-line 12 to the nip region between the rollers 13 and 14. Since the film between the extruding head 10 and the freeze-line 12 is substantially cylindrical, we need only to evaluate the geometric properties of the film between the freeze-line 12 and the region between the rollers 13 and 14.

As seen in FIGURE 1, the length of the film at the center is the distance $S_A$ which is the hypotenuse of the right angle A formed by the vertical height $h$ and one-half of the diameter of the tube. The length of the film at the folds is the distance of the hypotenuse formed by the height $h$ and the side of the flattened film which is one-half the difference between the flat width and the diameter of the tube. Since the flat width is one-half the circumference, the distance X, as seen in FIGURE 4, is a function of $\frac{1}{2}(\frac{1}{2}\pi D - D)$. Therefore, the distance $S_B$ at the fold of the film, between the freeze-line 12 and the nip region, is expressed $S_B = \frac{1}{4}\sqrt{16h^2 + 2D^2 - 4\pi D^2 + 4D^2}$. The corresponding leg in the center of the film, i.e., the distance $S_A$, between the freeze-line 12 and the nip region is expressed by $S_A = \frac{1}{2}\sqrt{4h^2 + D^2}$.

Now consider two points on the tube with point "Y" at the center and point "Z" at the fold. At the beginning of travel, the point "Y" and "Z" at the freeze-line 12 may be assumed to originate at the same instant and at the same vertical height $h$. As the points "Y" and "Z" travel from the freeze-line 12 to the nip region of the rollers 13 and 14, it is found that they reach the nip at the same instant. Since point "Y" travels a longer path than point "Z" it follows that point "Y" must travel at a correspondingly greater speed. To compensate for the speed differential which exists between the center of the flattened film 11 and the folded edges thereof, the resilient sleeves 23 and 29 are ground concave and convex respectively so as to provide a differential speed gradient between the center of the rollers 13 and 14 and the ends thereof. By evaluating the formula given for $S_A$ and $S_B$ with respect to a particular tubular film producing apparatus, the speed differential of points "Y" and "Z" can be readily obtained, and the rollers 13 and 14 ground accordingly. Furthermore, since the sleeves 23 and 29 are of resilient material, the film 11 passing therebetween is not damaged during the flattening operation.

Seen in FIGURE 5 is an alternate arrangement of the extruding and roll apparatus of FIGURE 1 and is substantially identical thereto. The only exception is that the roll 14 is displaced relative to roll 13 to provide a distance D between the nip region of rolls 13 and 14 and a line of initial contact of the film 11. This arrangement assures that the film 11 is engaging the roll 13 and traveling at substantially the same speed as the surface of roll 18 at each point along the axial extent thereof before the film reaches the nip region between rolls 13 and 14.

Additionally, it will be understood that the cover 29 of roll B may have a P & J hardness factor 5 to 100 greater than the P & J hardness factor of cover 23, thereby being substantially softer than the roll cover 23.

It will be understood that variations and modifications may be effected without departing from the spirit and scope of the novel concepts of this invention.

I claim as my invention:

1. An apparatus including a pair of forming rolls for flattening tubular film, said rolls comprising:

first and second roller cores for receiving the film therebetween;

a first sleeve of resilient material secured to the exterior of said first core for rotation therewith, said first sleeve having a diameter at the center which is different than the diameter at the ends of said first sleeve; and a second sleeve of resilient material secured to the exterior of said second core for rotation therewith, said second sleeve having a diameter at its center which it is different than the diameter at the ends of said second sleeve, whereby the surface of said first and second sleeves are in mating relation at a nip region to cause the center of the flattened film to pass between the sleeves at a different speed than the speed of the folded edges passing between the sleeves.

2. The apparatus according to claim 1, wherein said second sleeve has a P & J hardness factor of 5 to 100 greater than the P & J hardness factor of said first sleeve.

3. The apparatus according to claim 1, wherein said film engages said first sleeve along a line of initial contact of the surface of the sleeve and is wrapped partially about the sleeve, and wherein said second sleeve forms a nip region with said first sleeve a distance displaced from the line of initial contact of said film with said first sleeve.

4. An apparatus including a pair of forming rollers for flattening tubular film, said rolls comprising:

first and second roller cores for receiving the film therebetween;

a first sleeve of relatively hard resilient material secured to the exterior of said first core for rotation therewith, said first sleeve having a diameter at its center which is different than the diameter at the ends of said first sleeve; and a second sleeve of relatively soft resilient material secured to the exterior of said second core for rotation therewith, said second sleeve having a diameter at its center which is different than the diameter at the ends of said second sleeve, whereby the surfaces of said first and second sleeves are in mating relation at the nip region to cause the center of the flattened film to pass between the forming rollers at a different speed than the speed of the folded edges passing between the rollers.

5. The apparatus of claim 4, wherein said first sleeve has a P & J hardness factor of 0–2, and said second sleeve has a P & J hardness factor of 20–30.

6. The apparatus of claim 5, wherein said first sleeve has a diameter at its center which is less than the diameter at its ends, and said second sleeve has a diameter at its center which is greater than the diameter at its ends.

7. The apparatus of claim 4, wherein said first sleeve has a diameter at its center which is less than the diameter at its ends, and said second sleeve has a diameter at its center which is greater than the diameter at its ends.

8. The apparatus of claim 4, wherein the diameter at the center of said first and second sleeves provides a linear velocity which is a function of $\frac{1}{2}\sqrt{4h^2+D^2}$, and the diameter at the ends of said first and second sleeves provides a linear velocity which is a function of $\frac{1}{4}\sqrt{16h^2+\pi 2D^2-4\pi D^2+4D^2}$.

References Cited

UNITED STATES PATENTS

| | | | |
|---|---|---|---|
| 1,685,873 | 10/1928 | Evans et al. | 271—80 |
| 1,960,580 | 5/1934 | Fraser | 100—176 XR |
| 3,009,200 | 11/1961 | Voigt | 18—14 |

BERNARD STICKNEY, Primary Examiner

U.S. Cl. X.R.

18—14; 100—176; 226—191; 271—80